(12) United States Patent
Park et al.

(10) Patent No.: US 7,284,335 B2
(45) Date of Patent: Oct. 23, 2007

(54) GUIDELINE GENERATION APPARATUS FOR POWER TOOL

(75) Inventors: Keith Park, Pocklington (GB); Robert Firth, Pocklington (GB)

(73) Assignee: GMCA Pty Limited (AU)

( * ) Notice: Subject to any disclaimer, the term of this patent is extended or adjusted under 35 U.S.C. 154(b) by 0 days.

(21) Appl. No.: 11/103,280

(22) Filed: Apr. 11, 2005

(65) Prior Publication Data
US 2005/0223571 A1 Oct. 13, 2005

(30) Foreign Application Priority Data
Apr. 13, 2004 (GB) ................. 0408200.4

(51) Int. Cl.
*B27B 9/00* (2006.01)
(52) U.S. Cl. ............... 33/286; 33/DIG. 21; 83/520
(58) Field of Classification Search .......... 33/286, 33/333, 640, 641, 642, DIG. 21; 83/520, 83/521, 522.11, 522.15
See application file for complete search history.

(56) References Cited

U.S. PATENT DOCUMENTS

| | | | | |
|---|---|---|---|---|
| 2,806,492 | A | * | 9/1957 | Becker ................. 83/520 |
| 3,504,716 | A | * | 4/1970 | Morganson et al. ........ 30/123 |
| 4,257,297 | A | * | 3/1981 | Nidbella ................. 83/471.3 |
| 6,988,439 | B2 | * | 1/2006 | Liu et al. ................. 83/520 |
| 2001/0049988 | A1 | | 12/2001 | Ushiwata et al. |
| 2003/0233921 | A1 | | 12/2003 | Garcia et al. |
| 2005/0126356 | A1 | * | 6/2005 | Garcia et al. ............ 83/13 |
| 2006/0101969 | A1 | * | 5/2006 | Garcia et al. ............ 83/477.2 |

FOREIGN PATENT DOCUMENTS

| | | | |
|---|---|---|---|
| JP | 2001-347501 | | 12/2001 |
| JP | 2002-178220 | | 6/2002 |
| JP | 2004-009182 | | 1/2004 |
| JP | 2004209760 | A * | 7/2004 |
| JP | 2005335079 | A * | 12/2005 |
| JP | 2006068903 | A * | 3/2006 |

* cited by examiner

*Primary Examiner*—R. Alexander Smith
(74) *Attorney, Agent, or Firm*—McKee, Voorhees & Sease, P.L.C.

(57) ABSTRACT

The invention relates to the provision of a power tool such as a jigsaw, circular saw or mitre saw which is provided with guideline generating means. The guidelines are typically generated as laser beams and the invention allows for the generation of at least first and second, side by side guidelines. The guidelines are generated onto the workpiece and the area which lies between the guidelines defines the path along which a cutting blade of the power tool is to be directed. Preferably the guidelines are spaced such that a first guideline lies to one side of the blade and the other guideline lies to the other side of the blade thus allowing the guidelines to be viewable on both sides during the cutting operation.

24 Claims, 6 Drawing Sheets

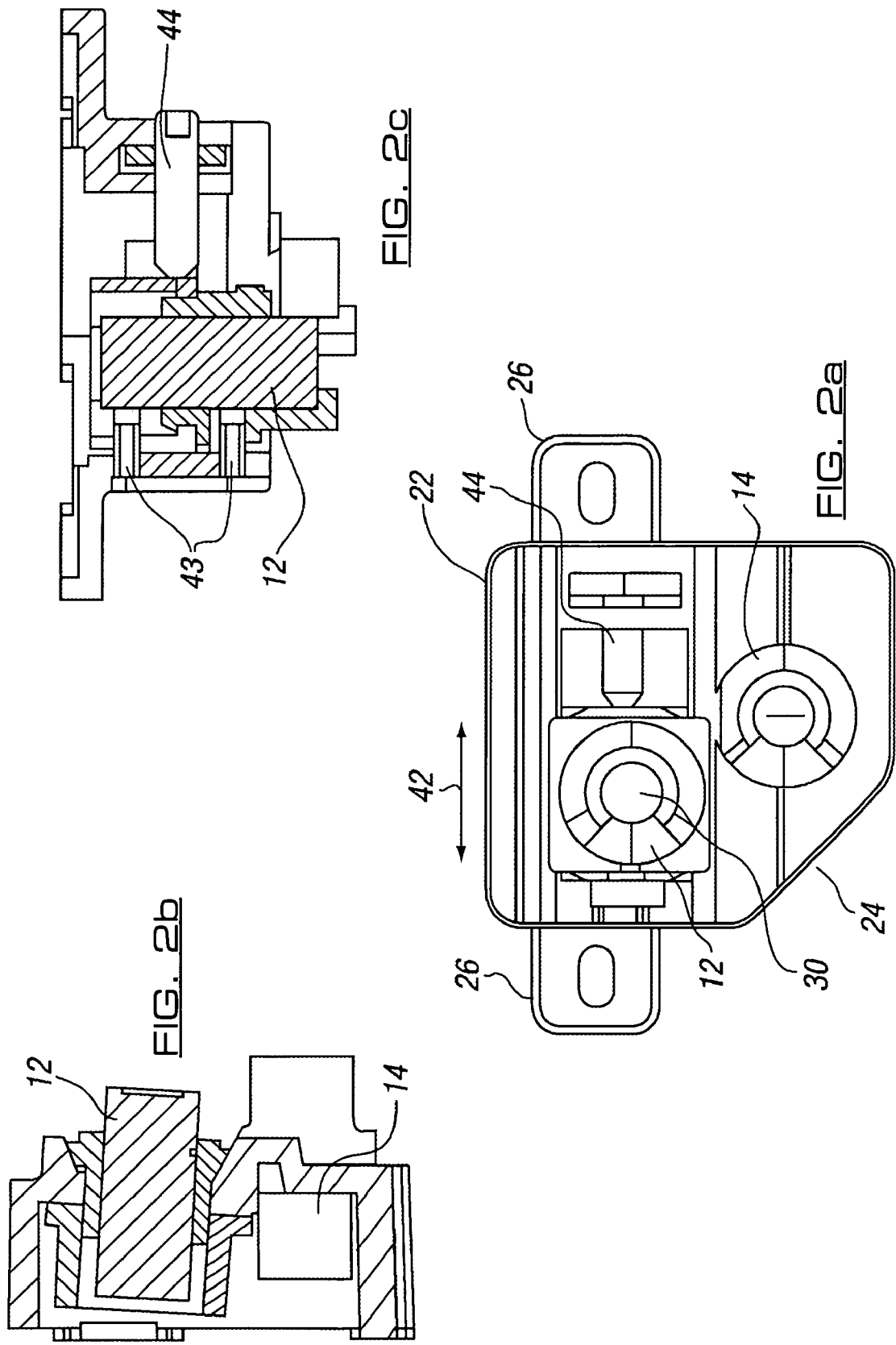

GUIDELINE GENERATION APPARATUS FOR POWER TOOL

Figure 1A:
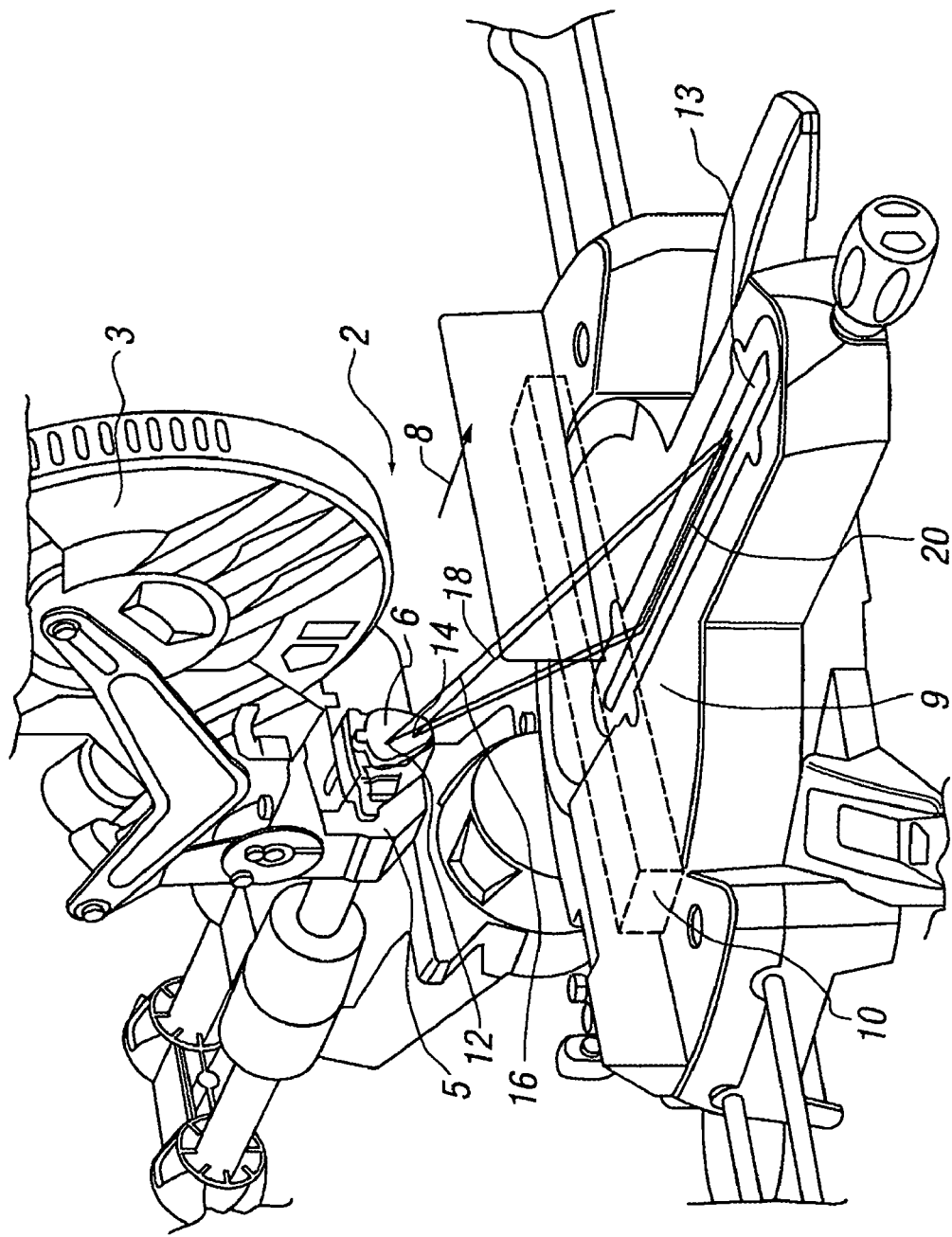
Figure 1B:
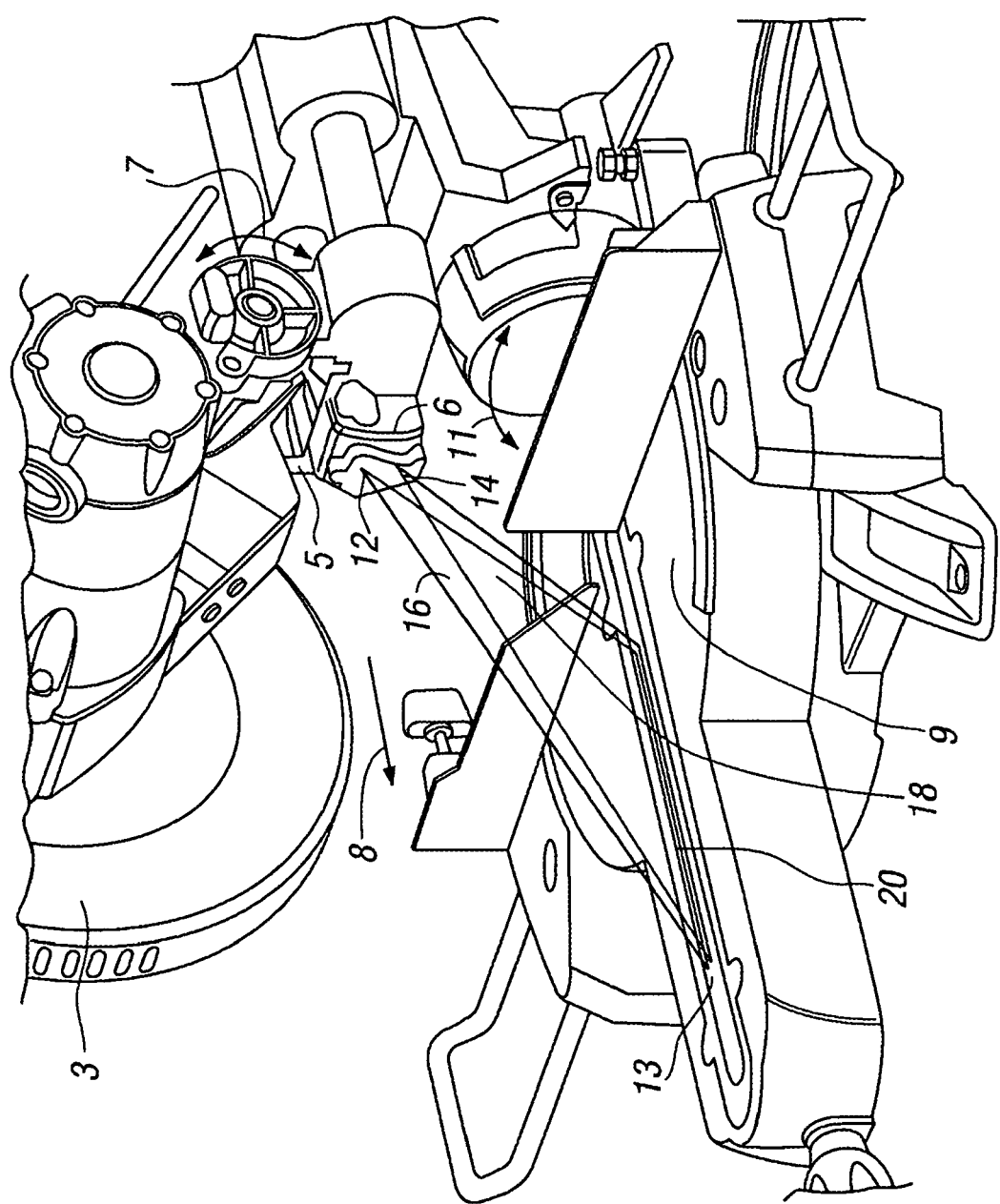
Figure 2F:
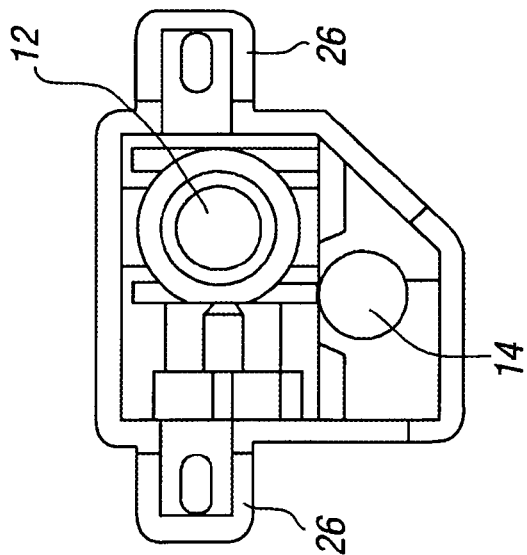
Figure 2E:
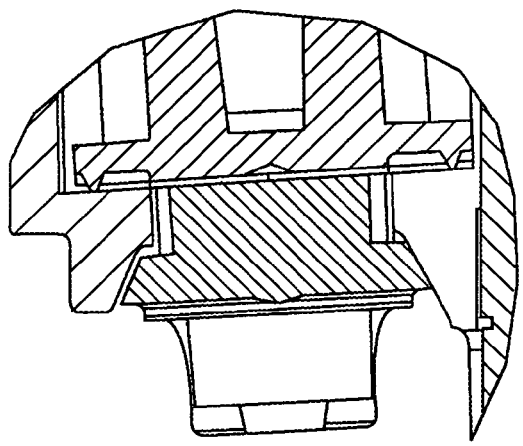
Figure 2D:
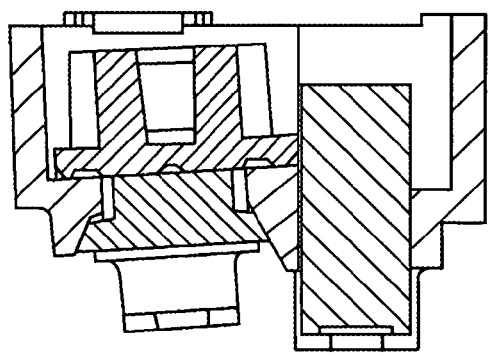

The invention to which this application relates is a guidance system for use with a power tool and, in particular, for use with a power tool designed to perform a cutting action on a workpiece. The guidance system is for use in providing a number of guidelines onto at least part of said workpiece. The guidelines act as a guide and determine a path along which the blade of the cutting tool should be directed by the user.

The use of a guide path drawn onto a workpiece by pen, pencil or by a scribing tool, is well known. However, the provision of the guideline onto the workpiece can often become obliterated due to debris from the cutting action and/or may not be provided in a truly accurate or straight manner.

In an attempt to improve this, it is known from previous patent applications to generate a guideline from a light source such as an LED or, more preferably, a laser device which is mounted onto the power tool. The laser device is mounted and adjusted so as to generate the guide line onto the workpiece from the power tool and allows the user to line up the guide line with a particular point or further line along which they desire the blade to pass. Furthermore debris on the workpiece does not mask the guideline as the same is projected onto the workpiece and therefore is always present and always viewable on the workpiece.

However, conventionally only one guideline is generated and positioned so as to lie to one side of the path of the cutting blade of the power tool. This therefore means that if the user is positioned to operate the power tool at certain positions such as to the opposite side of the blade from which the guideline is positioned or behind the power tool the person will not be able to view the guideline along all or at least a portion of the guideline on the workpiece as the same is masked by the blade and/or the power tool body. This problem is pronounced when the guideline is generated from the power tool at a position which is towards the highest point of the tool, such as on the cutting unit of a mitre saw as the guideline which is generated can become unfocussed when it reaches the workpiece and the distance from the cutting unit on which the laser generating means is positioned and the workpiece means that there is a significant opportunity for the guideline to be obstructed by another part of the machine and/or forth laser generating means to be damaged as the cutting unit is moved between cutting and storage positions. Thus, in order to use the conventional guideline generating means, the user can sometimes be forced to operate the power tool in a position which is at best inconvenient to the user and, at worst, dangerous to the user.

The aim of the present invention is to provide means for generating guidelines onto a workpiece for following by user control of a cutting blade of a power tool in a manner which is more advantageous and which allows the user to hold and move the power tool from any of a range of positions and still be able to view the guidelines.

In a first aspect of the invention, there is provided a power tool including guideline generating means, said generating means enabling the generation of a plurality of guidelines to define a path to be followed when performing an operation on a workpiece with the power tool, characterised in that said guidelines are projected from a location or locations on said power tool to provide spaced side by side guidelines on and/or adjacent to said workpiece.

Typically the guidelines are generated to be parallel and spaced apart by a distance which is greater than the width of a cutting blade fitted on the power tool.

In one embodiment, first and second guidelines are generated, typically a first guideline generated to one side of the path of the cutting blade of the power tool and a second guideline to the second, opposing side of the cutting blade of the power tool. Typically, the portion of the workpiece which lies between said first and second guidelines defines the area or path along which the blade is to pass in performing the cutting operation on the workpiece.

Typically the means for generating the guidelines is located on the power tool at a position behind the cutting blade of the power tool when the blade is in the cutting position. Typically the guidelines which are generated are respectively generated to first and second sides of the cutting blade onto the workpiece and/or power tool from a location behind the blade with respect to the direction of movement of the cutting unit in which the blade is mounted to perform the cutting unit.

In one embodiment, when the cutting blade is provided for rotation, the guideline generating means are provided to lie at a location on the power tool which is below the axis of rotation of the cutting blade when the cutting blade is in a storage position. In one embodiment when the cutting blade is moved to the in use position the location of the guideline generating means is substantially in line with the axis of rotation of the cutting blade.

Typically the centre of the guideline generation means mounting on the power tool is substantially in line with the line of cut of the cutting blade.

Typically the guidelines are generated as laser beams and are referred to as such hereonin. However it should be appreciated that this invention is not limited to guidelines generated via laser beams and that other means are possible such as the use of LED's to generate the guidelines.

In one embodiment the guideline generating means are mounted on support means to which the cutting unit which includes the cutting blade is mounted and moves forward with the cutting unit when performing a cutting operation and is angularly adjustable along with the cutting unit as the angle of cut on the workpiece is angularly set.

Typically the guidelines which are generated are substantially parallel when appearing on the workpiece.

In one embodiment, the first and second guidelines are generated from a single generating means. In one embodiment the guideline generating means incorporates a plate with apertures at the outlet from said guideline generating means so as to split the laser light which is generated into two guidelines.

Alternatively, and in many instances preferably, the first and second guidelines are generated from first and second laser generating means respectively, said first and second laser generating means preferably provided in a unit. In which ever embodiment the Guideline generating means in accordance with the invention can be provided as an integral part of the power tool or is provided to be retrofitted to already assembled tools.

When first and second laser generating means are provided, the first generating means is mounted at a first location and the second laser generating means is provided at a location offset to the first within a unit mounting. In one embodiment, the second laser generating means is offset upwardly and to the side of the position of the first laser generating means when the mounting is in position on the power tool.

In a preferred embodiment, one of the said first or second laser generating means is factory set in position in a mounting and cannot be adjusted thereafter with respect to the mounting and the other of the first or second laser generating means is located in the mounting to be positionally adjustable with respect to the mounting and hence the other laser generating means by the user of the power tool. The adjustment of one of the laser generating means allows "fine" tuning of the linear position of the guideline which is generated by the user during use so as, for example, to take into account a change in thickness of the cutting blade which may be used with the power tool so as to allow the first and second guidelines to be positioned on either side of the blade on the workpiece.

In one embodiment, the first and second laser generating means are positionally adjustable with respect to the power tool by adjustment of the mounting on the power tool.

In one embodiment, each of the first and second laser generating means includes a casing, said casing rotatably adjusted under factory conditions to set the position of the same with respect to the mounting so as to ensure parallelism of the guidelines which are generated. Once set, resilient ribs, provided in the mounting, act to retain said casings in the set orientation. Preferably adhesive is added and/or other mechanical engagement means are provided to further secure each casing in position and hence prevent rotational adjustment of both of the casings by the user of the power tool.

In a further aspect of the invention, there is provided a guideline generating means incorporating a body and located on said body are guideline generating units and characterised in that said guideline generating means is capable of generating at least first and second spaced side by side guidelines onto the workpiece to be cut with the blade.

In one embodiment the first guideline is positioned to one side of a power tool blade position on the workpiece and the second guideline positioned on the opposing side of the blade on said workpiece.

In a further aspect of the invention there is provided a power tool, said power tool comprising a base, a support which is slidable in a plane substantially parallel with the surface of said base, a cutting unit incorporating a blade for rotation, said cutting unit positioned on the support for pivotal movement between a raised position and a lowered position for cutting a workpiece, and wherein located on the support and facing towards the blade and workpiece, is a guideline generating unit, said guideline generating unit provided such that pivotal movement of the cutting unit to adjust the angle of cut on the workpiece is followed by the guideline generating means.

Typically, the guideline generating means incorporates first and second laser generating means, one offset to the other so as to allow the generation of a first guideline onto a workpiece to a first side of the cutting blade and a second guideline to a second side of the cutting blade on a workpiece.

In one embodiment the laser generating means are provided with a power supply which is the same as that which is used to power the operation of the tool. In an alternative embodiment the laser generating means are provided with their own power supply such as, for example, the provision of a battery or batteries within the housing in which the laser generating means are provided.

In one embodiment the laser generating means can be selectively switched on and off and in one embodiment the switching system allows the selective switching on and off of each of the laser generating means independently of the others. In an alternative embodiment masking means can be provided which allow the selective masking of one of the laser generating means so as to allow the generation of a single laser line for specific uses.

Specific embodiments of the invention are now described with reference to the accompanying drawings, wherein:

FIGS. 1a and b illustrate for demonstrative purposes, the guidelines which can be generated in accordance with the invention in a first embodiment;

FIGS. 2a-f illustrate views of a specific embodiment of the invention; and

Figure 3A:
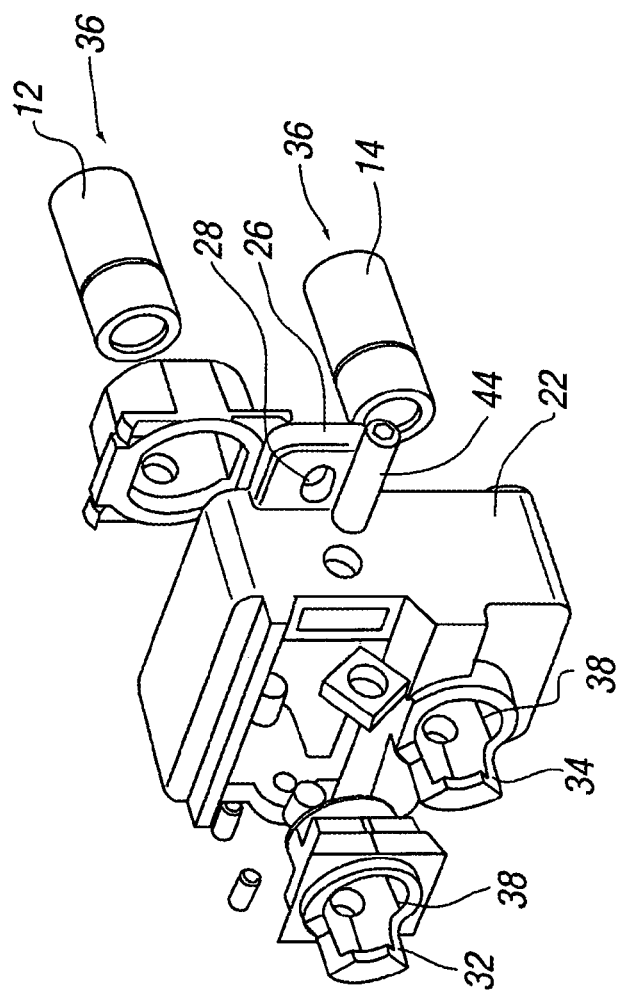
Figure 3C:
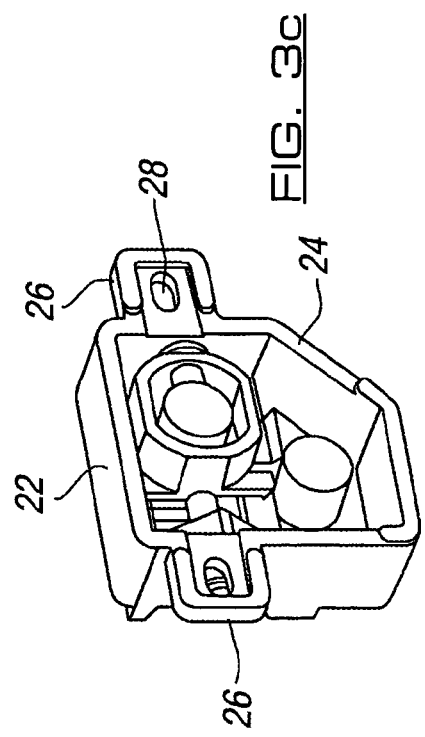
Figure 3B:
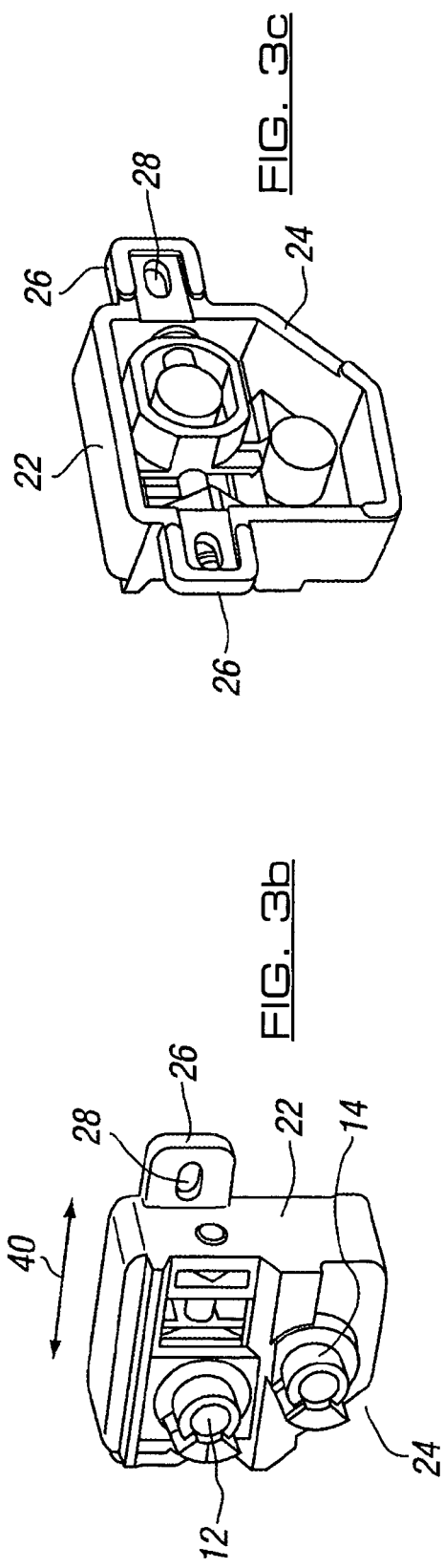

FIGS. 3a-c illustrate perspective views of the invention of the embodiment of FIGS. 2a to e.

Figure 4A:
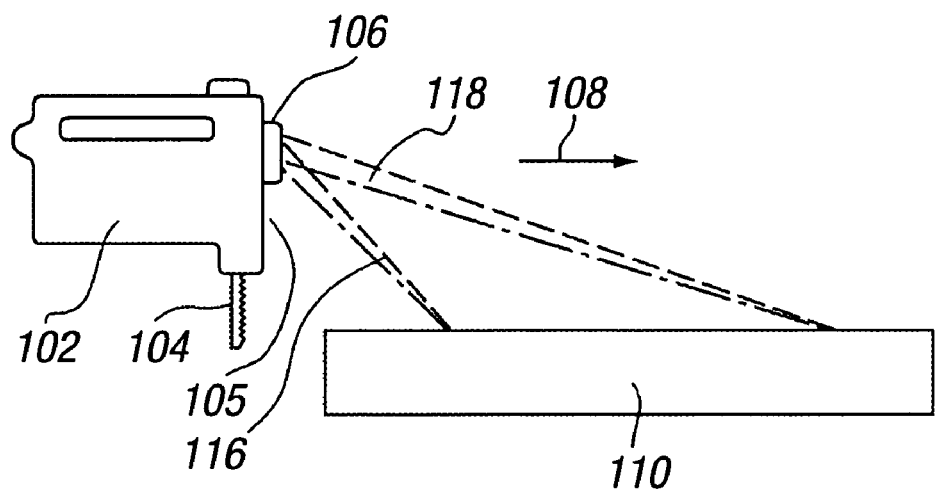

FIGS. 4a and b are side elevation and top perspective views, respectively, of the guideline generating means on another tool.

Referring firstly to FIGS. 1a and b there is shown first and second perspective views of part of a mitre saw assembly 2. The assembly includes a cutting unit 3 in which is provided a circular rotatable cutting blade. The cutting unit is pivotally moveable as indicated by arrow 7 between a raised position, as shown, and a lowered position in which the blade is brought down toward the base 9 on which a workpiece 10 to be cut (shown in broken lines) to exert the cutting action on the workpiece. As this embodiment is shown as a mitre saw the guidance line generating means 6 in the form of a laser generating unit, is not pivotally movable between the raised and lowered positions with the cutting unit, but is pivotally movable with the cutting unit and support to which the guideline generating means is mounted, to be angularly pivotable with respect to the base 9 as indicated by arrow 11 to be movable between the vertical position as shown and a position at 45 degrees. Although shown to be angularly adjustable to 45 degrees in only one direction it should be appreciated that certain mitre saw designs can be angularly adjustable to 45 degrees in both directions and in this case the guideline generating means will move in both directions also. With the guideline generating means 6 on the face 5 rather than on the cutting unit 3 so the guideline generating means is positioned much lower and at a position substantially behind the cutting unit in terms of the direction of movement of the same when performing a cutting operation. This therefore means that the guideline generating means 6 is closer to the workpiece and is provided with an unobstructed path to the workpiece such that the laser guidelines emitted therefore are significantly more focussed and clearly applied to the workpiece that would be the case if the guideline generating means was mounted on the cutting unit. This accuracy and clarity is particularly important when two guidelines are being generated in relatively close proximity. The guideline generating means generates the guidelines to the front of the power tool or, in other words, in advance of the direction of movement 8 of the power tool to advance the cutting blade in the cutting unit 3 through the work piece 10 and in the direction of the arrow 8 along the slot 13 to perform the cutting operation. In this case, the guidelines are generated by laser and the unit 6 is provided with first and second laser generating means 12, 14. The formation of the unit and the positioning of the laser generating means with respect to the same is described in more detail with reference to the subsequent drawings. The first and second laser generating means 12, 14, generate first and second guidelines 16, 18 respectively. The first guideline 16 is generated to a first side of the cutting blade path and the second guideline 18 lies to the opposing side of the cutting blade path when the guidelines are generated to form the elongate guideline area 20 which is generated on the surface of the workpiece and/or base of the mitre saw. It will be appreciated that as there is provided a guideline 16, 18 on either side of the cutting blade, then the user of the power tool will always be able to view at least one of the guidelines 16, 18, regardless of their position with respect to the power tool as the cutting blade 4 and/or power tool body 22 will not mask both of the guidelines.

The provision of the guideline generating unit 6 is now described in more detail with regard to FIGS. 2*a-f* and 3*a-c*. The unit includes a mounting 22 and in this case, the unit is provided for use in a mitre saw and is to be mounted on a support for the cutting unit of the saw such that the laser generating unit will follow the angular adjustment of the cutting unit and hence cutting blade. For this reason, the wall portion 24 is angled so that the same does not form an obstruction to the angular adjustment of the support. It will therefore be appreciated that the outer shape of the unit can be adjusted to suit particular uses. The mounting also includes location lugs 26 which allow the unit to be located on the power tool at a suitable location. The lugs are provided with apertures 28 which are slotted and which receive securing screws or other means (not shown). The provision of the slotted apertures 28 will be described in more detail subsequently. Within the mounting, there are provided the first and second laser generating means 12, 14. In this embodiment, the laser generating means used are either class 1 lasers if they are mains powered or class 2 if they are to be battery powered.

Each of the laser generating means 12, 14, is angularly positioned with respect to the mounting and with respect to each other so as to ensure that, firstly, the laser beams which are emitted via the openings 30 are respectively aligned so as to ensure parallelism and, furthermore, to ensure that the guidelines which are generated are offset to either side of the cutting blade on the workpiece.

Typically, the casings of the laser generating means 12, 14 are cylindrical as shown in FIG. 3*a* and therefore the mounting is required to include location means 32, 34 into which the casings can be inserted as indicated by arrow 36 and then located for use. In this case, the location is achieved by the provision of crush ribs 38 in the mounting such that when a laser generating means has been positioned within the location means 32, 34 the crush ribs act to maintain the laser generating means in position. However, it is preferred that once the rotational adjustment of the laser generating means 12, 14 has been achieved under factory conditions, that the same are retained in that position and therefore mechanical locking means and/or, as in this case, adhesive is provided to lock the laser generating means 12, 14, in the location means 32, 34 once suitably adjusted such that the same can not be rotatably adjusted by the user of the power tool.

The position of the unit 6 with respect to the power tool can be adjusted via the provision of the slots 28. To do so, the screws which pass through the slots 28 and into the power tool body, are loosened such that adjustment of the housing with respect to the power tool can be made as indicated by arrow 40 in FIG. 3*b* so as to allow the adjustment of the position of the unit so that the guidelines generated are to either side of the cutting blade with respect to the workpiece.

Furthermore, the adjustment of the position of the laser generating means 12 with respect to the laser generating means 14 can also be achieved. The laser generating means 14 is provided in a fixed position in the mounting but the laser generating means 12 and the location means 32 therefor, are linearly adjustable as indicated by arrow 42 in FIG. 2*a* by the selective rotation of the grub screw 44 which acts against resilient springs 43 as shown in FIG. 2*c* to allow the fine tuning adjustment of the laser generating means 12 with respect to the laser generating means 14. Once adjusted, the resilient spring and grub screw act to retain the same in position. This adjustment allows, for example, differences in the widths of cutting blades which may be used with the power tool, to be taken into account such that the guidelines which are generated will still lie to either side of the cutting blade fitted to the power tool at that instant. Typically, the laser generating means 12 and location means slide linearly within the mounting on guide surfaces.

The provision of the unit as herein described, in which the laser generating means are offset and at slightly different angles allows the use of conventional laser generating means in the unit and still achieves the guidelines generated on the workpiece which are located side by side and pass along substantially the same length on the workpiece and/or power tool base.

Figure 4B:
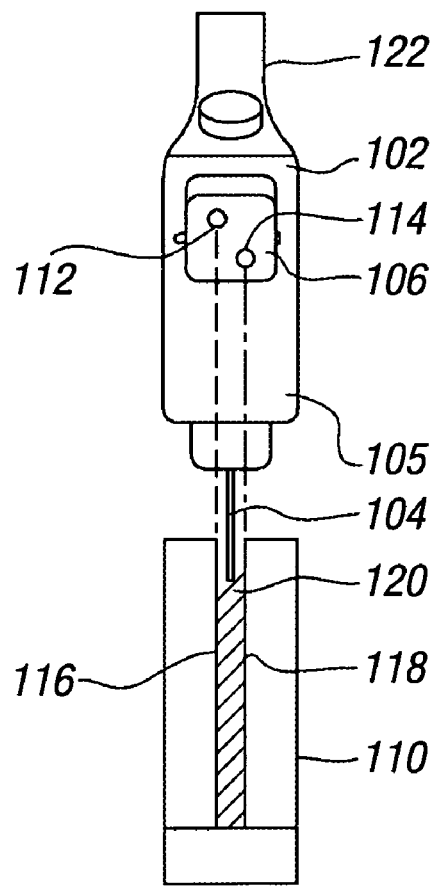

Referring now to FIG. 4*a* which shows an elevation and 4*b* which shows a perspective from above, there is illustrated a further use of the guideline generating means of the invention in conjunction with another power tool, 102 which, in this case, is shown schematically as a jigsaw. This illustrates how the guideline generating means can be used to advantage with a range of power tools which are required to be moved along a guide path. In this embodiment the jigsaw has a blade 104 which operates in a normal manner and is therefore not described in detail herein. A guideline generating means in accordance with the invention 106 is mounted on the front face 105 of the tool body. The unit includes means for generating guidelines to the front of the power tool or, in other words, in advance of the direction of movement 108 of the power tool in use to advance the cutting blade 104 through a work piece 110 to perform a cutting operation thereon. In this case, the guidelines are generated by laser and the unit 106 is provided with first and second laser generating means 112, 114. The formation of the unit and the positioning of the laser generating means with respect to the same is as described with reference to FIGS. 2 and 3. The first and second laser generating means 112, 114, generate first and second guidelines 116, 118 respectively. It is shown in FIG. 4*b* how the first guideline 116 is generated onto the workpiece 110 to a first side of the cutting blade 104 and the second guideline 118 lies to the opposing side of the cutting blade 104 when the guidelines are generated onto the workpiece 110. Between the first and second guidelines there is an area 120 shown in hatching along and within which the cutting blade 104 can be directed to perform the cut on the workpiece. Furthermore, it will be appreciated that as there is provided a guideline 116, 118 on either side of the cutting blade, then the user of the power tool will always be able to view at least one of the guidelines 116, 118, regardless of their position with respect to the power tool as the cutting blade 104 and/or power tool body 122 will not mask both of the guidelines.

The generation of the first and second guidelines has significant advantage over conventional systems which all relate to the generation of a single guideline only and, for the reasons previously indicated, this represents a significant advance in the provision of guidelines from power tools.

The invention claimed is:

1. A power tool comprising:
   first and second guideline generating means enabling the generation of first and second guidelines, respectively, to define a path to be followed when performing an operation on a workpiece with the power tool;

the guidelines projected from a location or locations on the power tool so as to be spaced, side by side on and/or adjacent to the workpiece;

the first guideline generating means being set at a factory in a non-adjustable position in a mounting; and the second guideline generating means being set at the factory in an adjustable position in the mounting, and retained in the set position unless subsequently adjusted by a user of the power tool.

2. A power tool according to claim 1 characterised in that the area lying between the said guidelines defines the path to be followed.

3. A power tool according to claim 1 characterised in that the guidelines are substantially parallel and spaced apart by a distance which is greater than the width of a cutting blade fitted on the power tool such that a guideline lies to either side of the cutting blade.

4. A power tool according to claim 1 characterised in the first guideline being generated to one side of the proposed path of a cutting blade of the power tool, and the second guideline being generated to the second, opposing side of the proposed path of the cutting blade of the power tool.

5. A power tool according to claim 1 characterised in that the first and second generating means for generating the guidelines are located on the power tool at a position behind the cutting blade of the power tool when the blade is in the cutting position.

6. A power tool according to claim 5 characterised in that the guidelines are projected to first and second sides of the cutting blade onto the workpiece and/or power tool and beyond the cutting blade from a location behind the cutting blade with respect to a direction of movement of the power tool when performing the cutting operation on the workpiece.

7. A power tool according to claim 1 characterised in that the cutting blade is provided as part of a cutting unit movable between a raised storage position and a lowered cutting position and the means for generating the guidelines are positioned on the power tool below an axis of rotation of the cutting blade when the cutting blade is in the storage position.

8. A power tool according to claim 7 characterised in that when the cutting blade is moved to the in use position the location of the guideline generating means lies substantially in a horizontal plane with the axis of rotation of the cutting blade.

9. A power tool according to claim 7 characterised in that the center of the guideline generating means is substantially in line with the line of cut of a cutting blade of the power tool.

10. A power tool according to claim 7 characterised in that the guideline generating means are mounted on a support means on which the cutting unit is mounted and which moves with the cutting unit when performing a cutting operation.

11. A power tool according to claim 10 characterised in that the support means is angularly adjustable along with the cutting unit as the angle of cut on the workpiece is selected.

12. A power tool according to claim 1 characterised in that the first guideline generating means is mounted at a first location and the second guideline generating means is provided at a location offset to the first.

13. A power tool according to claim 12 characterised in that the second guideline generating means is offset upwardly and to the side of the position of the first guideline generating means when positioned on the power tool.

14. A power tool according to claim 1 characterised in that the first and second guideline generating means are positionally adjustable with respect to the power tool by adjustment of the mounting on the power tool.

15. A power tool according to claim 1 characterised in that each of the first and second guideline generating means includes a casing, said casing rotatably adjusted under factory conditions to set the position of the same with respect to the mounting so as to ensure parallelism of the guidelines which are generated.

16. A power tool according to claim 15 characterised in that resilient ribs are provided in the mounting which act to retain said casings in the set orientation.

17. A power tool according to claim 16 characterised in that adhesive and/or other mechanical engagement means are provided to secure each casing in position and prevent rotational adjustment by the user of the power tool.

18. A power tool according to claim 1 characterised in that the first and second laser generating means are mounted in a unit fitted to the power tool.

19. A power tool according to claim 1 characterised in that the guideline generating means are provided as an integral part of the power tool.

20. A power tool according to claim 1 characterised in that the first and second guideline generating means can be selectively switched on and off.

21. A power tool according to claim 20 characterised in that selective switching of first and second guideline generating means is possible to allow the generation of a single guideline.

22. A power tool according to claim 1 characterised in that the guidelines are generated by laser beams emitted from the guideline generating means.

23. A power tool according to claim 1 characterised in that the guideline generating means are provided with a power supply which is the same as that which is used to power the operation of the tool.

24. A power tool according to claim 1 characterised in that the guideline generating means are provided with their own power supply.

* * * * *